United States Patent [19]

Winnick

[11] 3,910,986

[45] Oct. 7, 1975

[54] PROCESS FOR OXIDIZING BETA-ACYLOXYETHYL-TOLUATES

[75] Inventor: Charles N. Winnick, Teaneck, N.J.

[73] Assignee: Halcon International, Inc., New York, N.Y.

[22] Filed: Jan. 12, 1972

[21] Appl. No.: 217,260

[52] U.S. Cl. ............................................. 260/475 P
[51] Int. Cl.$^2$ ........................................ C07C 69/82
[58] Field of Search ................... 260/475 P, 475 R

[56] References Cited
UNITED STATES PATENTS

| | | | |
|---|---|---|---|
| 2,727,919 | 12/1955 | Saunders | 260/475 |
| 2,858,334 | 10/1958 | Landau et al. | 260/475 |
| 2,992,271 | 7/1961 | Hay | 260/524 |
| 3,036,122 | 5/1962 | Ardis et al. | 260/524 |
| 3,420,878 | 1/1969 | Vanderwerff | 260/524 |
| 3,442,767 | 5/1969 | Hall | 260/524 |
| 3,644,506 | 2/1972 | Williamson | 260/524 |
| 3,721,708 | 3/1973 | List et al. | 260/524 |

FOREIGN PATENTS OR APPLICATIONS

| | | | |
|---|---|---|---|
| 597,627 | 5/1960 | Canada | 260/475 P |

Primary Examiner—Anton H. Sutto
Assistant Examiner—E. Jane Skelly
Attorney, Agent, or Firm—William C. Long; Riggs T. Stewart; David Dick

[57] ABSTRACT

Beta-acyloxyethyl-toluates are oxidized with molecular oxygen under conditions such that the water content of the oxidation mixture is maintained at a value below 6% by weight.

13 Claims, No Drawings

PROCESS FOR OXIDIZING BETA-ACYLOXYETHYL-TOLUATES

BACKGROUND OF THE INVENTION

Fiber- or film-forming polyethylene terephthalate polyester resins have found wide-spread commercial and consumer acceptance and, consequently, are now produced on a large scale. To date, substantially all commercial production of these resins has proceeded via one of two routes. The first route involves the production of pure terphthalic acid which is then esterified with ethylene glycol to form the polyester resin monomer, bis-(beta-hydroxyethyl)terephthalate. The second route proceeds via dimethyl terephthalate which is subjected to a transesterification with ethylene glycol to form the polyester resin monomer.

Both of these routes suffer from the same major drawback, which is the necessity for the use of extremely pure terephthalic acid or dimethyl terephthalate in order to produce resin products of acceptable quality. The purification techniques which have been developed for these materials have proven to be both complex and expensive.

Moreover, the production of the necessary terephthalic acid or dimethyl terephthalate has itself been found to be complex and expensive. The production of both is based on para-xylene. To produce terephthalic acid, the para-xylene is subjected to molecular oxygen oxidation or to nitric acid oxidation. Oxygen oxidation has required special additives, e.g. bromine compounds, which have been difficult to remove from the final product, especially because of the insolubility of terephthalic acid. Nitric acid oxidation suffers from obvious corrosion problems and from the formation of significant quantities of by-products, to the detriment of process economics.

For the production of dimethyl terephthalate, processes such as those disclosed in U.S. Pat. Nos. 2,653,165; 2,772,305; and 2,849,978 have been used and avoid many of the disadvantages associated with the production of terephthalic acid itself. But the product, dimethyl terephthalate, is not a monomer and requires substantial additional processing before a direct polyethylene terephthalate precursor is obtained, during which much methanol is lost.

Recent technology, proposed to overcome these disadvantages, involves conversion of a not necessarily pure terephthalic acid to a bis-(betaacyloxyethyl) terephthalate which can then be readily purified and can easily be converted to bis-(beta-hydroxyethyl) terephthalate; see co-pending applications Ser. Nos. 41,653 and 46,448 filed respectively May 28, 1970 and June 15, 1970 (both now abandoned but their disclosures are incorporated in U.S. Pat. Nos. 3,796,745 and 3,756,987, respectively). But even this highly advantageous process requires terephthalic acid as a raw material and, aside from the difficulties associated with producing it, terephthalic acid is difficult to handle because of its poor solubility characteristics.

In the co-pending application of John Kollar, Ser. No. 158,756, filed July 1, 1971, there is disclosed a process permitting facile production of polyester resin precursors directly from para-xylene. In that process beta-acyloxyethyl-para-toluates are oxidized by means of molecular oxygen to product mono-(beta-acyloxyethyl) terephthalates which can be used to produce polyethylene terephthalate polyester resins. beta-acyloxyethyl-toluates.

It is a principal object of this invention to provide an improved process for producing mono-(beta-acyloxyethyl) terephthalates by the molecular oxygen oxidation of the corresponding beta1acyloxyethyl-tolutes.

In accordance with the invention, it has been found that significantly improved conversions can be realized when the oxidation of the mono-acyloxyethyl-toluates is carried out under conditions such that the water content of the oxidation mixture is maintained below 6% by weight, preferably below 5% by weight, and most suitably at most 4% by weight.

The reaction involved in this invention can be illustrated by the following equation:

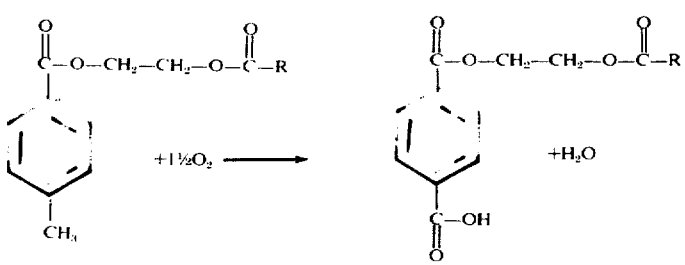

wherein "R" is a radical selected from the group consisting of hydrogen, methyl and ethyl radicals, so that the acyl moieties of the beta-acyloxyethyl-para-toluates are formyl, acetyl or propionyl moieties. While the process will be described by particular reference to para-toluates as illustrated above, which is the preferred embodiment, it is fully applicable to the oxidation of the corresponding meta-toluates and can readily be applied to mixtures of meta- and para-toluates.

That the reaction illustrated by the foregoing equation can be carried out with both high conversion and high selectivity is surprising. (Conversion is defined as the mols of the beta-acyloxyethyl-para-toluate reacting per mol of such toluate fed while selectivity is defined as the mols of terephthalate moieties formed per mol of para-toluate reacting.) Thus, the acyloxyethyl substituent on the para-toluate reactant seemingly remains essentially unattacked during oxidation despite the length and apparent reactivity of the side chain, i.e., of the many logical points of reaction (the methyl group of the aromatic nucleus and those on the acyloxyethyl side chain) that the reaction favors so predominantly attack of the methyl group is quite unexpected. Even more unexpected is the stability of the product under the reaction conditions and the comparative absence of undesired side reactions which one would expect to occur but which need not occur to a significant extent. One such side reaction is transesterification wherein two mols of mono-(beta-acyloxyethyl) terephthalate would react to form one mol of bis-(beta-acyloxyethyl) terephthalate and one mol of free terephthalic acid. Such a normally aceptable side reaction can sometimes be disadvantageous because terephthalic acid, being insoluble, would precipitate and introduce considerations involved in solids handling. Interesterification reactions, resulting in the formation of mixed esters of ethylene glycol with toluic and/or terephthalic acids would also be expected but need not occur to any substantial extent.

The ability to avoid a substantial amount of transesterification is particularly noteworthy and especially surprising in view of the fact that such transesterification reactions are known to be reversible and the insolubility of terephthalic acid (a material which, because it is difficultly soluble at best, would normally be expected to precipitate from the reaction medium) would tend to drive the equilibrium in a direction favoring esterification. This need not occur to significant extent in the reaction systems involved herein although reaction conditions favoring transesterification can readily be employed where this reaction is desired.

It has been found, however, that the presence of water in the reaction mixture has a limiting effect upon conversion and selectivity, and upon the rate of conversion, if its quantity is not maintained below a predetermined maximum value of 6% by weight, preferably below 5% by weight, and most suitably at most 4% by weight. Water is formed as a by-product of the oxidation and may also be present to some extent in the feed to the oxidation reaction. When, however, the content of water, whatever may be its source, is maintained below the indicated limit in the oxidation mixture, significant benefits in terms of conversion, selectivity, and rate of conversion can be realized. The improvement in selectivity is evidenced by the suppression of by-product formation, conveniently measured in terms of the formation of carboxybenzaldehydes, more particularly 4-carboxybenzaldehyde.

As indicated by the equation above, the reaction with which this invention is particularly concerned involves the molecular oxygen oxidation of a beta-acyloxyethyl-para-toluate in the liquid phase to form acyloxyethyl derivatives of terephthalic acid. In the most preferred embodiment, betaacetoxyethyl-para-toluate is oxidized to the beta-acetoxyethyl terephthalates.

Although the foregoing reaction can be conducted in the absence of catalytic materials, it is often advantageous to employ a catalyst to increase the rate of the reaction. Suitable catalysts are the polyvalent heavy metals, exemplified by the metals of Groups VB, VIB, VIIB and VIII of the Periodic Table (see Lange's Handbook of Chemistry, 7th edition, pp. 58-59 [1949]). Such metals include vanadium, chromium, molybdenum, tungsten, manganese, iron, cobalt and nickel. The use of such catalyst metals as cobalt and manganese is preferred and cobalt is particularly effective. Mixtures of such metals can also be used as catalysts. The noble metals of Group VIII of the Periodic Table (ruthenium, rhodium, palladium, osmium, iridium and platinum), while useful, are less preferred because of their cost. When a catalyst is employed, it is desirable that it be introduced to the reaction system in a soluble form, preferably as a chelate or salt of an organic acid. Organic acids suitable as the anion source for the catalyst metal salt include the fatty acids (straight or branch chain) having from 1 to 20 or more carbon atoms such as formic acid, acetic acid, butyric acid, isobutyric acid, 2 ethylhexan-6-oic acid, decanoic acid, dodecanoic acid, stearic acid, eisosanoic acid, and the like, as well as the hydrocarbyl aromatic carboxylic acids such as benzoic acid, naphthanoic acid, the phthalic acids and derivatives of such acids wherein the aromatic nucleus contains one or more lower alkyl substituents (meaning substituents of 1 to 6 carbon atoms), most notably toluic acid.

The amount of catalyst employed, if any, can be varied over a wide range with as little as 0.0001 wt. % being sufficient to accelerate the reaction rate appreciably. Increasing the amount of catalyst tends to increase reaction rate further, and amounts up to 10 wt. % can be employed for this purpose. Even more catalyst can be employed, but there is little advantage to be gained thereby. It is normally desired to employ amounts of catalyst within the range of 0.001 wt. % to about 5 wt. % and it is normally preferred to employ amounts of catalyst between about .01 wt. % and about 3 wt. %. The weight percents of catalyst hereinabove set forth refer to the weight percent of contained catalyst metal in relation to the total liquid phase within the reactor.

Most preferably, the foregoing reaction is carried out in the presence of one or more promoters of the type described in my co-pending application Ser. No. 187,569, filed Oct. 7, 1971. Such promotors include alkanes ($C_3$—$C_{12}$), e.g. n-butane, isobutane, n-pentane and 2-methyl-butane; alkenes ($C_3$—$C_{12}$), e.g. butene-1, butene-2, isobutylene and 2-methylbutene-2; primary and secondary $C_2$—$C_{12}$ alkyl alcohols, e.g. ethanol, n-propanol, isopropanol, butan-1-ol and butan-2-ol; $C_2$—$C_{12}$ alkanals, e.g. acetaldehyde, propionaldehyde, n-butyraldehyde and isobutyraldehyde; $C_4$—$C_{12}$ alkylidene ketones, e.g. butan-2-one, petan-2-one and petan-3-one; $C_3$—$C_{12}$ dialkyl ethers having at least one secondary carbon atom adjacent to the etheric oxygen atom, e.g. methyl ethyl ether, diethyl ether and diisopropyl ether; $C_4$—$C_{12}$ cycloalkanes, e.g. cyclohexane and cyclododecane; $C_4$—$C_{12}$ cycloalkyl secondary alcohols, e.g. cyclohexanol and cyclododecanol; $C_4$—$C_{12}$ cycloalkylidene ketones, e.g. cyclohexanone and cyclododecanone; dihdyrofuran; tetrahydrofuran, furfural, and tetrahydropyran.

The ratio of promoter to para-toluate reactant affects the rate of para-toluate oxidation with greater amounts of promoter relative to the amount of para-toluate reactant giving faster rates of para-toluate oxidation and, other conditions (temperature, reaction time, etc.) being equal, greater ultimate conversions of para-toluate to terephthalate. As little as 0.002 mol of promoter per mol of para-toluate reactant is sufficient to significantly accelerate reaction rate, although somewhat larger ratios of promoter to para-toluate would usually be employed. It is generally desired to use amounts of promoter sufficient to provide a ratio (mol basis) of promoter to para-toluate of at least 0.05 and preferably amounts sufficient to give a molar ratio of promoter to para-toluate of at least 0.1 Maximum amounts of promoter, on the other hand, are usually governed by economics, not by process factors. Such economic considerations normally indicate the usage of less than 5 mols of promoter per mol of para-toluate reactant, desirably less than 3 mols and preferably less than 2 mols of promoter per mol of paratoluate reactor. In general one therefore would prefer to employ amounts of promoter sufficient to provide a ratio (mol basis) of promoter to para-toluate reactant within the range of from about 0.002 to about 5.0, especially within the range from about 0.05 to about 3.0 and particularly within the range from about 0.10 to about 1.2 mols of promoter per mol of para-toluate.

As indicated in the co-pending applications referred to hereinabove, reaction conditions for the non-promoted toluate oxidation are broadly within the range of 80°–300°C., desirably within the range of 110°–200°C. and preferably within the range of 125°–175°C. While these conditions are entirely practicable for the promoted oxidation reaction of this invention, somewhat milder conditions are generally desired. Thus, in the case of the use of promoters, it is desirable to employ oxidation temperatures for the conversion of para-toluate to terephthalate within the range of 90°C.–200°C., and preferred conditions are within the range of 100°C.–150°C.

Reaction pressure in this invention is in no way critical to the conduct of the process so long as it is sufficient to maintain a liquid phase. Atmospheric, subatmospheric or superatmospheric pressures are all readily employable, although or economic reasons pressures normally within the range of 5–1000 p.s.i.a., desirably within the range of 50–500 p.s.i.a. and preferably within the range of 100–400 p.s.i.a. would be used. There appears to be very little, if any process reason why pressures outside these ranges would not be both operative and practicable.

The times of reaction employed are essentially those of the aforesaid co-pending applications. Thus, times of reaction broadly within the range of 0.1–20 hours, desirably 0.5–15 hours and preferably 1–10 hours can be employed in the conduct of this process. In continuous operation, reaction time, as herein used, is defined as the volume of liquid phase contained within the vector vessel divided by total volume of liquids fed to the reactor (measured at actual conditions) per hour. Reaction time in batch operation is essentially self-explanatory.

The source of molecular oxygen employed in the conduct of this reaction can be any of those normally used in the art. High-purity oxygen (containing 85 mol % or more of oxygen) can be employed. Suitable sources of molecular oxygen also include air, or air diluted with a suitable inert gas (e.g. nitrogen, carbon dioxide, argon, helium, neon, methane, ethane or mixtures of any one or more of the foregoing with air). Oxygen-containing gases of purity intermediate between that of air and high-purity oxygen are equally suitable.

The process of this invention can be conducted without solvents, or, if desired, can be carried out advantageously in the presence of solvents. Suitable solvents include those normally liquid hydrocarbons which are substantially inert under reaction conditions such as, for example, benzene. Aliphatic tertiary aliphatic alcohls, such as t-butanol, are satifactory solvents as are esters of aliphatic alcohols with monobasic aliphatic carboxylic acids, such as ethyl acetate. Also suitable are the low fatty acids containing from 1 to 4 carbon atoms per molecule such as formic acid, acetic acid, propionic acid, butyric acid, and isobutyric acid. Of these solvents, acetic acid is preferred because of its ready availability and low cost. When solvents are employed, they may comprise from 10 wt.% to 98 wt.% of the total phase medium within the reactor, desirably from 25 wt.% to 90 wt.% of the medium and preferably from 50 wt.% to 80 wt.% of this medium. Another class of solvents which can be employed with advantage are the ethylene glycol diacylates, the acyl group of which contain 1 to 3 carbon atoms, i.e. ethylene glycol diformate, diacetate and dipropionate. Ethylene glycol monoacylates, i.e. ethylene glycol monoformate, ethylene glycol monoacetate and ethylene glycol monopropionate also can be used but are less stable because more susceptible to oxidative attack under reaction conditions. Mixtures of the foregoing solvents can of course be used and, in a preferred embodiment, a mixture of acetic acid and ethylene glycol diacetate is used.

In accordance with this invention, the water content of the oxidation mixture can be controlled below the specified limit (below 6 wt.%, preferably below 5 wt.%, most suitably at most 4 wt.%) in a number of ways. Firstly, care can be taken to insure that the feed materials are essentially anhydrous so that little or no water is introduced into the system with the feed and the quantity of materials other than the reactants, e.g. solvents or diluents, can be selected so that the quantity of water coproduced in the reaction amounts to less than the desired maximum percentage of the reaction mixture from the oxidation zone. Preferably, however, steps are taken to remove water from the system during the course of the reaction so that the quantity of water in the reaction mixture remains below the specified maximum value at all times. This can be done by adding a water acceptor, i.e. a material which combines with water and removes it from the environment. A particularly suitable material for this purpose is acetic anhydride. The anhydride is, of course, converted by reaction with water into acetic acid which can be readily separated from the product mixture. However, other water acceptors such as molecular sieves (e.g. molecular sieve 3A), alumina, silica gel, and the like may also be used so long as they are readily removed from the reaction mixture or form a reaction product with water which is also readily removed. In the case of large scale operation, however, it is preferred that the excess water be removed by vaporization. In this case, the reaction is carried out under conditions so that water vapor and other volatile vapors are continuously or intermittently removed and the water is withdrawn from the system. In this embodiment, it is particularly desirable to operate in the presence of a volatile solvent, e.g. acetic acid or the like, and after separation of the water from the condensed vapor effluent the solvent can be continuously or intermittently returned to the reaction zone. In another modification of this procedure, the reaction can be carried out in a plurality of reaction zones arranged in series with each reaction zone being a closed system but with water being vaporized away from the reaction mixture issuing from each reaction zone before it is introduced into the succeeding reaction zone. In this way the water content of the reaction mixture will be intermittently controlled but can at all times be maintained below the indicated maximum. It will be apparent that other means for maintaining the water content of the reaction mixture sufficiently low can be employed. Such other means include: drying between reaction stages by passing the reaction mixture through a bed or beds of an absorbent, e.g. molecular sieves such as 3A molecular sieves, alumina, silica gel, and the like.

The beta-acyloxyethyl-para-toluates which are the feed materials for the above-described process are readily prepared from para-toluic acid in a variety of ways. For example, a two-stage esterification procedure wherein the toluic acid is esterified first with ethylene glycol and the resulting beta-hydroxyethyl-para-toluate is esterified with the appropriate aliphatic acid (i.e., formic acid, acetic acid or propionic acid) can be employed. The first esterification is readily conducted by refluxing the reactants in excess ethylene glycol and the second can be easily conducted by refluxing the hydroxyethyl toluate with the appropriate acid, e.g. glacial acetic acid. Intermediate purification (by vacuum distillation, for example) is preferably employed for elimination of ethylene glycol di-p-toluate which would also be formed. A similar but simpler procedure employing ethylene glycol-mono-acylate can also be employed. Another method involves the reaction of ethylene oxide with para-toluic acid to form beta-hydroxyethyl-para-toluate which can be esterified with the appropriate carboxylic acid as hereinabove described. Yet another and particularly advantageous method for preparing the acyloxyethyl-para-toluates is by acidolysis of para-toluic acid with an ethylene glycol diacylate, e.g. ethylene glycol diacetate. Such an acidolysis can be conducted by reacting para-toluic acid with the ethylene glycol diacylate, preferably ethylene glycol diacetate, in the liquid phase at a temperature between 100°C. and 350°C. It is generally preferred to conduct this acidolysis without catalyst at temperatures within the range of about 220°C. to about 350°C. although Bronsted and/or Lewis acid catalysts can be employed at lower temperatures within the aforesaid range. In carrying out this acidolysis, it is generally desired to employ a minimum of one mol of ethylene glycol diacylate per mol of para-toluic acid and preferably at least 1.2 mols of such diacylate per mol of para-toluic acid. Substantially greater amounts of ethylene glycol diacylate can with advantage be employed, and it is preferred to employ ratios of diacylate to para-toluic acid within the range of 2 to 10 mols per mol.

The product of the process described above can be characterized as a precursor for polyethylene terephthalate which comprises at least one of mono-(beta-acyloxyethyl) terephthalate, bis-(beta-acyloxyethyl) terephthalate, and terephthalic acid. This terminology reflects the fact that the product of the process contains, apart from unconverted beta-acyloxyethyl-para-toluate, varying proportions of one or more of these three constituents in addition to other polyethylene terephthalate precursors. These other polyethylene terephthalate precursors include mono-(beta-hydroxyethyl) terephthalate and bis-(beta-hydroxyethyl) terephthalate together with materials characterized as low molecular oligomeric materials containing the polyethylene terephthalate mer structure. Some by-products are also present. The by-products include such materials as benzaldehyde, benzoic acid, 4-carboxybenzaldehyde, 4-carboxybenzyl alcohol, 4-aldehydo-acyloxyethyl benzoate, and 4-methylol-acyloxyethyl benzoate and a small amount of para-toluic acid and beta-hydroxyethyl-para-toluate.

The proportions of the mono- and bis-(acyloxyethyl) terephthalates relative to each other and to the amount of terephthalic acid present in the precursor product of the process can vary widely depending upon the manner in which the reaction is conducted. For example, if a solvent other than an ethylene glycol diacylate is employed (e.g. when acetic acid is the sole solvent employed), the predominant reaction product will generally be mono-(beta-acyloxyethyl) terephthalate and, apart from the unconverted starting material, over 50%, commonly over 60% and usually over 80% of the precursors in the reaction effluent will be this material. The effluent can also contain quantities of terephthalic acid.

On the other hand, when an ethylene glycol diacylate solvent is employed (either as the sole solvent or in conjunction with other solvents) the glycol diacylate can readily interact with the reaction products to produce the bis-(beta-acyloxyethyl) terephthalate product. This gives the effect of a partial acidolysis in situ of the mono-(beta-acyloxyethyl) terephthalate product to form the bis analog, although a different reaction mechanism may in fact be involved.

The process of this invention has been described in detail above with particular reference to the conversion of para-toluates to terephthalates. However, as previously mentioned, this process is as readily applicable to the conversion of the corresponding meta-toluates to the corresponding isophthalates or to the conversion of meta-para-toluate mixtures to isophthalate-terephthalate mixtures. References to para-toluic acid hereinabove made should, of course, be understood as referring to meta-toluic acid when the toluate is the meta-toluate. Operating conditions for treatment of the meta compounds are essentially identical with those suitable for treatment of the para compounds. The isophthalates can be readily hydrolyzed to isophthalic acid, or used directly, i.e. in the preparation of polyesters.

The following examples are presented in order further to illustrate this invention but are not intended as limiting the scope thereof. Unless otherwise stated, all parts and percents, with the exception of conversion figures, are on a weight basis. Conversions are on a molar basis, consistent with the definition given above.

EXAMPLE I

This Example illustrates the preparation of the raw material which is subjected to oxidation in accordance with the invention in Examples II to IX.

Beta-acetoxyethyl-para-toluate is prepared by reacting ethylene glycol diacetate with technical grade para-toluic acid (mol ratio of diacetate to par-toluic acid of 5:1). The reactants and 0.67 wt.% toluene sulfonic acid as catalyst are charged to a sealed, stainless-steel, agitated 30-gallon reactor and quickly heated to 190°C. The reaction mixture is held at this temperature for 10 hours and then cooled. The reaction product in the reactor is in the form of a solution which is distilled under vacuum to obtain a purified beta-acetoxyethyl-para-toluate. Gas chromatographic analysis of the purified material indicates it to have a purity in excess of 89%. The major impurities or co-constituents are unreacted ethylene glycol diacetate, p-toluic acid, impurities contained in the original toluic acid feed, and catalyst degradation products.

EXAMPLE II

A feed composed of 40% beta-acetocyethyl-para-toluate (the product produced in Example I), 1% cobalt acetate (tetrahydrate), 3.2% acetaldehyde (promoter) and the balance acetic acid is charged to a one liter titanium autoclave, provided with a turbine agitator and an overflow tube positioned so that the autoclave contains 573 cc of liquid. Air is passed to an open ⅛ inch tube below the agitator. The effluent gas is cooled in a double pipe condenser and the condensed organic materials are returned to the reactor through a dip tube. The vent is passed through a Grove pressure controller set to maintain the pressure in the reactor at 300 psig. The reaction is carried out at 115°C. After steady state operation is obtained, a dry feed mixture is fed at the rate of about 260 grams per hour to provide a residence time of 2.2 hours. Air is introduced at the rate of 1.73 liters/min. (STP). The amount of water in the reaction mixture is 3.7%. The product is analyzed by converting all acids to their methyl esters and analyzing the methylated mixture by gas chromatography, conversion of 49% to mono-(beta-acetoxyethyl) terephthalate is found and a rate of conversion of about 0.3 mol per liter per hour is indicated. Only 1 mol % of 4-carboxybenzaldehyde (based on aromatic moiety fed) is present.

EXAMPLE III

The procedure of Example II is repeated except that the feed mixture is composed of 40% beta-acetoxyethyl-para-toluate (as produced in Example I), 1% cobalt acetate (tetrahydrate), 3.2% acetaldehyde (promoter), 12.2% acetic anhydride, and the balance acetic acid. The free water in the reaction mixture is 3.3% and the conversion to mono-(acetoxyethyl) terephthalate is found to be 76%, with only about 0.25 mol % of 4-carboxybenzaldehyde being present. This reaction represents a rate of conversion of about 0.35 mol per liter per hour.

EXAMPLE IV

Example II is repeated using a feed mixture composed of 40% betaacetoxyethyl-para-toluate (as produced in Example I), 1% cobalt acetate (tetrahydrate), 3.2% acetaldehyde, 3% water, and the balance acetic acid. The reaction mixture contains 7% water and the conversion to mono-(betaacetoxyethyl) terephthalate is found to be only 29% with a rate of conversion of about 0.18 mol per liter per hour. The amount of 4-carboxybenzaldehyde present is 2.8 mol %.

EXAMPLE V

The equipment described in Example II is modified so that the overhead condensate is withdrawn and glacial acetic acid pumped in to the autoclave at the same rate as the condensate withdrawal. The same feed as Example IV is used. The overhead condensate is withdrawn at a rate of 72.6 g/hr and contains 10.3 wt. % $H_2O$. The reaction mixture contains 3% water and the conversion to mono-(beta-acetoxyethyl) terephthalate is found to be 85%, with a corresponding high rate of conversion and low content of 4-carboxybenzaldehyde.

EXAMPLE VI

Example IV is repeated with the same feed, but the feed rate is doubled to 520 g/hr. The effluent contains 5% water. The effluent plus 100 g/hr acetic acid is fed to a 2 inch D. distillation column containing 5 Oldershaw sieve trays above the feed and 20 below. Overhead condensate is removed at the rate of 100 g/hr and at a reflux ratio of 8:1 based on overhead product. This overhead condensate contains 23 wt. % $H_2O$. The bottoms containing 0.5 weight % water are fed to an identical autoclave. The reaction mixture from the second autoclave contains 2.8 weight % $H_2O$ and the overall conversion to mono-(beta-acetoxyethyl) terephthalate is found to be 68%.

EXAMPLE VII

Example IV is repeated using the same feed, but 45 g/hr of Linde 3A molecular sieves are added as a slurry with the feed. The reaction mixture after decantation from the molecular sieves is found to contain 3.8 weight % $H_2O$ and the conversion to mono-(beta-acetoxyethyl) terephthalate is found to be 44%. The molecular sieves are washed with acetic acid, dried with nitrogen, heated to 230°C. and reused. The results with the regenerated sieves are essentially the same as those obtained in the first pass with the fresh sieves.

EXAMPLE VIII

The runs described in Examples II–VII are repeated at a temperature of 100°C. with a residence time of 4 hours, at 130°C. for 1.5 hours, at 150°C. for 0.8 hour and at 180°C. for 0.3 hour. Results comparable to these of Examples II–VII are obtained. Corresponding results are also realized when Examppls II–VII are repeated without the use of a promoter, but in this case increased temperature-residence time combinations are required e.g. operation is effected at 110°C. with a residence time of 10 hours, at 150°C. for 6 hours, and at 175°C. for 5 hours. It is noted, however, that the higher temperatures tend to produce effluents containing greater proportions of free terephthalic acid.

EXAMPLE IX

Experiments corresponding to Examples II–VII but using different promoters viz, n-butane, n-butyraldehyde, butan-2-ol, butan-2-one, cyclohexane, cyclohexanol and cyclohexanone, using different catalysts viz. cobalt stearate, cobalt naphthanoate, cobalt acetylacetonate, cobalt toluate, corresponding manganese salts and mixtures of cobalt and manganese salts, and using different solvents viz, ethylene glycol diacetate, t-butanol, ethyl acetate and propionic acid, give results generally corresponding to those of Examples II–VII and show the overall applicability of the critical water-limiting feature of the invention in an oxidation process of the character described.

EXAMPLE X

Runs corresponding to those described in Examples II–VII are carried out employing, instead of beta-acetoxyethyl-para-toluate, molar equivalent amounts of beta-formoxyethyl-para-toluate and beta-propionoxyethyl-paratoluate, produced by the procedure described in Example I using ethylene glycol diformate and ethylene glycol dipropionate. The results of these runs are substantially similar to those of Examples II–-VII.

EXAMPLE XI

Examples II–VII are repeated but beta-acetoxyethyl-meta-toluate, produced by the procedure of Example I using meta-toluic acid, is used as the ester component of the feed rather than beta-acetoxyethyl-para-toluate. Results comparable to those observed in Examples II- -VII are realized in the production of mono-(beta-actoxyethyl) isophthalates.

The embodiments of the invention in which an exclusive property is claimed are defined as follows:

1. A process comprising the step of oxidizing a beta-acyloxyethyltoluate, the acyl moiety of which is formyl, acetyl or propionyl by contacting said toluate in the liquid phase with molecular oxygen in the presence of a solvent inert under reaction conditions while controlling the content of water in the reaction mixture so that it is at a value below 6% by weight at all times during the oxidizing step.

2. A process for the production of a precursor for polyethylene terephthalate, said precursor containing mono-(beta-acyloxyethyl) terephthalate or a mixture of said mono-(beta-acyloxyethyl) terephthalate with at least one member of the group consisting of bis-(beta-acyloxyethyl) terephthalate and terephthalic acid, the acyl moiety in said precursor being formyl, acetyl or propionyl, said process comprising the oxidation of a beta-acyloxyethyl-para-toluate, the acyl moiety of which is that of the precursor, in the liquid phase with molecular oxygen while controlling the content of water in the reaction mixture at a value below 6% by weight.

3. A process as defined in claim 1, wherein the solvent is a mono-basic aliphatic carboxylic acid.

4. A process as defined in claim 1, wherein the oxidation is conducted at a temperature within the range from about 80°C. to about 300°C. and at a pressure sufficient to maintain a liquid phase.

5. A process as defined in claim 1, wherein the acyl radical is the acetyl radical.

6. A process as defined in claim 2, wherein the acyl radical is the acetyl radical.

7. A process as defined in claim 1, wherein the oxidation is carried out in the presence of a promoter.

8. A process as defined in claim 1, wherein the water content of the reaction mixture is controlled at a value below 5% by weight.

9. A process as defined by claim 2, wherein the water content of the reaction mixture is controlled at a value below 5% by weight.

10. A process as defined in claim 1, wherein the water content of the reaction mixture is controlled at a value of at most 4% by weight.

11. A process as defined in claim 2, wherein the water content of the reaction mixture is controlled at a value of at most 4% by weight.

12. A process as defined in claim 1, wherein the water content of the reaction mixture is controlled at a value of at most 4% by weight, acetic acid is employed as a solvent, the oxidation is conducted at a temperature within the range from about 80°C. to about 300°C. and at a pressure sufficient to maintain a liquid phase, and the acyl radical is the acetyl radical.

13. A process as defined in claim 2, wherein the water content of the reaction mixture is maintained at a value of at most 4% by weight, the oxidation is conducted at a temperature within the range from about 80°C. to about 300°C, and at a pressure sufficient to maintain a liquid phase, and the acyl radical is the acetyl radical.

* * * * *